United States Patent [19]

Kako et al.

[11] 4,112,160

[45] Sep. 5, 1978

[54] SOLID ADHEREND SUBSTRATES BONDED WITH RUBBER CEMENT COMPOSITIONS

[75] Inventors: Yuji Kako, Shizuoka; Toyoji Kikuga; Akira Toko, both of Fujieda, all of Japan

[73] Assignee: Sumitomo Durez Company, Ltd., Tokyo, Japan

[21] Appl. No.: 750,942

[22] Filed: Dec. 15, 1976

Related U.S. Application Data

[60] Division of Ser. No. 519,314, Oct. 30, 1974, Pat. No. 4,007,233, which is a continuation-in-part of Ser. No. 322,265, Jan. 9, 1973, abandoned.

[30] Foreign Application Priority Data

Jan. 11, 1972 [JP] Japan ................................. 47-4950

[51] Int. Cl.² ...................... B32B 15/06; B32B 15/18; B32B 15/08; B32B 15/10
[52] U.S. Cl. .................................... 428/460; 428/463; 428/473; 428/507; 428/520; 428/535; 428/904; 528/155; 528/153; 260/845; 528/143; 528/144; 528/137; 156/331
[58] Field of Search .................. 260/845, 54; 428/520, 428/507, 904, 463, 535, 473, 460

[56] References Cited

U.S. PATENT DOCUMENTS

| | | | |
|---|---|---|---|
| 3,660,202 | 5/1972 | Edington et al. | 260/845 X |
| 3,751,331 | 8/1973 | Dane et al. | 428/460 X |
| 3,917,554 | 11/1975 | Inoue et al. | 260/845 X |

*Primary Examiner*—P. C. Ives
*Attorney, Agent, or Firm*—Peter F. Casella; James F. Mudd; David A. Stein

[57] ABSTRACT

Rubber cement compositions which consist of rubbers and multi- (three and more) functional phenol-aldehyde modified bifunctional phenol resins, which are made by first obtaining the bifunctional phenolic resin by condensing 1 mole of bifunctional phenol with 0.5 to 3.0 moles of aldehydes in the presence of an alkaline catalyst, and then co-condensing 0.05 to 2.5 moles of multifunctional (three and more) phenols against 1 mol of the bifunctional phenols in the above-mentioned resin in the presence of an acidic catalyst, said co-condensed resin having a number average molecular weight of 700 – 1900, a resin melting point of 80° – 160° C, being curable and also being soluble in aromatic hydrocarbon solvents.

21 Claims, No Drawings

SOLID ADHEREND SUBSTRATES BONDED WITH RUBBER CEMENT COMPOSITIONS

REFERENCE TO PRIOR APPLICATION

This is a division of application Ser. No. 519,314, filed Oct. 30, 1974, now U.S. Pat. No. 4,007,233, which in turn is a continuation-in-part of application Ser. No. 322,265 filed Jan. 9, 1973, now abandoned.

The present invention relates to rubber cements, especially nitrile rubber cements used for adhesion of flexible polyvinyl chloride leathers to iron plates.

Rubber cements have generally such many advantages as high elasticity and high flexibility, adhesion to various kinds of adherends, good initial adhesive property, and excellent water resistance, oil resistance, chemicals resistance, weather resistance, and the like. But, if the substance of such a cement is merely a rubber, the cement shows a low cohesion due to its too large flexibility, and has a poor tackiness and adhesive properties. Therefore, it is improved by blending resins or fillers, and the like as a reinforcement to such a rubber cement. Especially, blending of phenolic resin has become the most important blending technique for such a rubber cement.

Among such rubber cements, nitrile rubber cements can generally well adhere to such a polar adherend as polyvinyl chloride and so forth, because nitrile rubber itself has a strong polarity, and it is possible to make an excellent durable adhesion by phenolic resin or amino resin vulcanization other than sulfur vulcanization, so it can be used as a structural adhesive, and moreover nitrile rubber cement has good compatibility with many kinds of phenolic resins so it can be modified so as to cover a wide range of adhesive properties by varying the type and quantity of blended phenolic resin. A cement which is blended from 50 to 100 parts of phenolic resin to 100 parts of nitrile rubber is used for adhesion of flexible polyvinyl chloride leathers, flexible polyvinyl chloride films, flexible polyvinyl sheets, cotton cloth, leathers, wood and so forth as an excellent cement for general purposes, and a nitrile rubber cement which is blended with more than 100 parts of phenolic resin is also used as an excellent metal structural adhesive for aircraft, brake linings and shoes, and the like.

The biggest problem of the adhesive used for adhesion of flexible polyvinyl chloride leathers is the staining of polyvinyl chloride by the cement. Messrs. Horioka and Takahashi reported as follows in their report titled "Surface staining of Plasticized Polyvinyl Chloride Bonded Matter caused by Rubber Cements" described in pages 29 and 30 of the preprint of "The Sixth Symposium on Adhesion and Adhesives" (held on June 5, 1968):

(I) On the staining of polyvinyl chloride caused by chloropreneakyl phenol resin cement:

Plasticizer included in polyvinyl chloride migrates into the chloroprene layer of the adhesive, and at the same time part of the stabilizer also migrates, so this part of polyvinyl chloride deteriorates by the action of ultraviolet ray, ozone, heat and so forth, and moreover, lower molecular components of the cement migrate into the surface layer of such a polyvinyl chloride with the plasticizer acting as carrier and enhance the degree of staining.

(II) On the staining of polyvinyl chloride caused by nitrile rubber-phenolic resin cement:

Nitrile rubber included in the cement can not essentially dissolve in any plasticizer and on the other hand phenolic resins readily dissolve into the plasticizer, so phenolic resins included in the cement migrate into the plasticizer layer of polyvinyl chloride, and the phenolic resins are discolored by the action of ultraviolet ray, ozone, heat, and the like; as a result, they stain the polyvinyl chloride.

Hitherto, there are some heat reactive type alkylphenol resins such as PR-50483, PR-50530 (both are products of Sumitomo Durez Company, Ltd.) and so forth as commercial products blended into the cement described above (I), and there are some thermosetting phenolic resins such as PR-17292, PR-12687 (both are products of Sumitomo Durez Company, Ltd.) and so forth as commercial products which are for blending into the cement described above (II). And according to the report described above, the source of staining of polyvinyl chloride in case (I) is the chloroprene rubber in the cement, and the source of staining in case (II) is the thermosetting phenolic resin. Therefore, the combination in general is a heat reactive type alkyl phenol resin of case (I) with a nitrile rubber of case (II), which is favored as a less staining cement for polyvinyl chloride, but such cements have some defects such as having low initial bonding strength, low bonding strength at higher temperature, and does not cure.

The present invention relates to an improved rubber cement composition free of such defects described above by using a multi- (three and more) functional, phenol-aldehyde modified, bifunctional phenolic resin as a modifying additive to nitrile rubber. Namely, the characteristics of such rubber cements in the present invention are excellent including their flexibility, retaining the excellent physical properties of nitrile rubber such as solvent resistance (resistance for dissolving into plasticizers), and are less staining to flexible polyvinyl chloride, excellent in initial bonding strength, long term bonding strength, bonding strengths at ordinary and elevated temperature, and are also heat curable, so they are applicable to structural adhesives, and are soluble in most solvents used for rubber cements including ketones such as acetone, methyl ethyl ketone, and the like, or aromatic hydrocarbon solvents such as benzene, toluene, xylene, and the like.

The present invention is characterized by using a multi-(three and more) functional, phenol-aldehyde modified, bifunctional phenol-aldehyde resin as a modifying additive of rubber. This phenol resin is obtained by co-condensing a bifunctional phenol, for example, para-cresol, para-ethyl phenol, para-propyl phenol, para-iso-propyl phenol, para-n-butyl phenol, para-tertiary-butyl phenol, para-amyl phenol, para-hexyl phenol, para-cyclohexyl phenol, para-octyl phenol, para-nonyl phenol, para-phenyl phenol, para-cumyl phenol, para-benzyl phenol, with aldehydes such as formaldehyde, acetaldehyde. These aldehydes are reacted in a mole ratio of about 3 and 0.5 moles to 1 mole of bifunctional phenols with an alkaline catalyst such as trimethylamine, triethylamine, caustic soda, caustic potash, calcium hydroxide, barium hydroxide. This product is further reacted with the addition of a mole ratio of about 2.5 to 0.05 moles of multi- (three and more) functional phenols, for example, phenol, metacresol, 3,5-xylenol, resorcinol, bisphenol F, bisphenol A, 4,4-bis (hydroxy phenyl) butyric acid, etc. to 1 mole of bifunctional phenol in the presence of an acidic catalyst such as formic acid, oxalic acid, acetic acid, hydrochloric acid, sulfuric acid, phosphoric acid, benzene-sulfonic acid, para-toluenesulfonic acid. In this reaction, when the molar ratio of multi- (three and more) functional phenol is larger, the obtained product is a novolak type and is cured by heating with hexamethylenetetramine, but, with the molar ratio is smaller, the product is a resol type and cures by itself when heated. The product is a phenolic resin which has a number average molecular weight between 700 and 1,900 and a melting point between 80° and 160° C. This is entirely different from the phenolic resin which consists of a mixture of bi- and multi- (three and more) functional phenols reacted with aldehydes, or a resin mixture merely blending a phenolic resin which consists of bifunctional phenols and aldehydes and a phenolic resin which consists of multi- (three and more) functional phenols and aldehydes.

The bifunctional phenols are those phenols having two of the ortho and para positions unsubstituted. Typical are the para-substituted phenols set forth hereinbefore. Suitable substituents are alkyl groups of 1 to 10 carbon atoms, cycloalkyl groups of 5 to 6 carbon atoms, aryl groups of 6 to 10 carbon atoms and alkaryl or aralkyl groups of 7 to 10 carbon atoms. The multifunctional or polyfunctional phenols are those phenols having at least three of their ortho and para positions unsubstituted. In addition to phenol and bisphenols are meta-substituted phenols such as disclosed hereinbefore. Suitable substituents include alkyl groups of 1 to 6 carbon atoms.

The aldehydes that can be employed in preparing the phenolic resins of the invention include those having 1 to 8 carbon atoms, such as formaldehyde, acetaldehyde, butyraldehyde, heptaldehyde, and the like.

The nitrile rubber used in preparing the adhesives of the invention are those available in the art. Nitrile rubbers suitable for use in the invention are disclosed in *Introduction to Rubber Technology*, Edited by Maurice Morton, Reinhold Publishing Corporation (1959), page 57 and pages 285-296, which is incorporated herein by reference. Nitrile rubber is a copolymer of a diene such as butadiene and a nitrile such as acrylonitrile. The monomers are polymerized in water cooled pressure vessels equipped with efficient agitation. At the completion of the reaction, the reaction is short-stopped and an antioxidant is added. When dry rubber product is desired, the latex is coagulated and the particles are dried.

The phenolic resins of the invention are incorporated in the nitrile rubber in a proportion of about 25 to about 150 parts by weight of phenolic resin per 100 parts by weight of nitrile rubber, preferably in a proportion of about 50 to about 100 parts of resin per 100 parts of rubber.

The rubber cement compositions of the invention can include the solvents, such as ketones and aromatic hydrocarbons, accelerators, fillers and other additives normally used in the art with nitrile rubber cements.

The following examples are intended to illustrate the invention and not to limit it. In this specification and claims, temperatures are given in centigrade and parts are by weight unless specified otherwise.

EXAMPLE 1

A. One mole of para-tertiary-butyl phenol and 2.2 moles of 37% formalin were charged into a flask, and the admixture were kept at 45° C, then 0.2 mole of 50% aqueous caustic soda solution was added very slowly drop by drop which takes 1 hour, and the pH of the mixture made to 10.2. Then, the temperature of mixture was raised to 70° C, held there 1 hour and a half for continued methylol forming reaction. Then the admixture was cooled and neutralized by adding 0.1 mole of 25% aqueous sulfuric acid until the aqueous layer shows a pH of 3.5. To eliminate such neutralized salts produced therein, it was washed with water of 50-60° C twice. Then, 0.6 mole of phenol, and 2 weight percent of oxalic acid were added to the phenol. The pH of the admixture was 1.5 [in this case, the pH measured in the aqueous layer after well mixing 2 parts of water with one part of the resin dissolved in xylene (1:)]. Then, the admixture was heated 30 minutes at 100° C to continue the novolak forming reaction, then cooled to room temperature, and 150 weight percent of xylene was added to the paratertiary-butyl phenol charged originally. This xylene solution was neutralized with 50% aqueous caustic soda solution until the pH of the aqueous layer was 3.4. Then, the resin solution was washed twice with water at 50°-60° C, to eliminate the neutralized salts produced, and dehydrated by heating under normal pressure, under vacuum and the solvent also removed under vacuum, keeping the temperature of the admixture at 150°-160° C. Finally a novolak type phenolic resin which showed a melting point of 135° C and a pH of 5.3 was obtained [by measuring the aqueous layer after well mixing two parts of water with one part of the resin-xylene solution (1:1)].

B. 100 parts of the resin of Example 1 A were mixed with 12 parts of hexamethylene tetramine used as a curing agent and pulverized.

C. An adhesive prepared by blending one hundred (100) parts of Hycar-1042 (a nitrile rubber Nippon Geon & Co., Ltd.) with 50 parts of the phenolic resin of Example 1 B. Curing conditions of the adhesives were as follows:

a. In the case of noncurable cement, the adhesive cement formulated by such formulae shown in Table I were spread on the facing surfaces of adherends, the quantity being 0.2 ml/in$^2$, and 2 minutes later, such adherends were pressed at room temperature.

b. In the case of curable cement, the adhesive cement formulated by such formulation shown in Table I were spread on facing surfaces of adherends, and left one night at room temperature for drying, and the coated adherends were reactivated 5 minutes at 200° C in a dryer, then were assembled and pressed 5 seconds under a pressure of 50 kg/cm$^2$ at 200° C.

The adhesive properties of this blend were all very good as shown in Table I. Adhesive properties of Comparative Example 2 has been placed in Table I for convenience of comparison.

Table 1.

| | Adhesion Test of a Flexible Polyvinyl Chloride Leather to Sheet Iron. | | | | | |
|---|---|---|---|---|---|---|
| | Noncurable Cement | | | Curable Cement | | |
| | Example 1 | Comparative Example 2 | Blank | Example 1 | Comparative Example 2 | Blank |
| Hycar #1042 | 100 | 100 | 100 | 100 | 100 | 100 |

Table 1.-continued

| | Adhesion Test of a Flexible Polyvinyl Chloride Leather to Sheet Iron. | | | | | |
|---|---|---|---|---|---|---|
| | Noncurable Cement | | | Curable Cement | | |
| | Example 1 | Comparative Example 2 | Blank | Example 1 | Comparative Example 2 | Blank |
| Phenolic Resin | 50 | 50 | 0 | 50 | 50 | 0 |
| Methyl Ethyl Ketone | 300 | 300 | 200 | 346 | 346 | 246 |
| Tolune | 150 | 150 | 100 | 173 | 173 | 123 |
| Calcium Silicate | | | | 15 | 15 | 15 |
| Zinc White | | | | 5 | 5 | 5 |
| Sulfur | | | | 1.5 | 1.5 | 1.5 |
| Accelerator (DM) | | | | 1.5 | 1.5 | 1.5 |
| Peel Bonding Strength | | | | | | |
| Testing Time / Testing Temperature | | | | | | |
| Just after bonding / 20° C | 2.2 | 1.2 | 0.0 | >11* | 8.9 | 0.6 |
| After two days / 20° C | 3.9 | 1.8 | 0.2 | >11* | 9.2 | 0.8 |
| After two days / 60° C | 0.3 | 0.1 | 0.0 | — | — | — |
| After two days / 100° C | — | — | — | 5.7 | 0.6 | 0.0 |
| After seven days / 20° C | 10.4 | 8.3 | 0.6 | >11* | 9.9 | 1.2 |
| After seven days / 60° C | 0.9 | 0.5 | 0.0 | — | — | — |
| After seven days / 100° C | — | — | — | 5.6 | 4.4 | 0.0 |
| Staining Resistance of Polyvinyl Chloride (Six months out door Exposure) | O | X | O | O | X | O |

(*Failure of polyvinyl chloride leather)

Peel Bonding Strength was tested by (T-peel test of polyvinyl chloride leather at 180° C), with peeling speed at 200 mm/min. Unit of peel bond strength is Kg/in.

In the case of curable cement, the test pieces were prepared by coating of adherends with cements, drying, and then pressed after reactivating 5 minutes at 200° C.

EXAMPLE 2

A. One mole of para-octyl phenol, 1.8 moles of acetaldehyde, 150 weight percent of xylene to para-octyl phenol, and 7 weight percent of methanol to para-octyl phenol were charged into a flask, and the admixture were kept at 45° C, then 0.25 mole of 50% aqueous caustic soda solution was added very slowly drop by drop which takes 1 hour until the pH of the mixture was 12.0. Then also keeping the temperature at 45° C, there followed a methylol forming reaction 8 hours, next the admixture was cooled and neutralized by adding 0.125 mole of 25% aqueous sulfuric acid until pH of 3.5 is indicated in the aqueous layer. To eliminate such neutralized salts produced therein, it was washed twice with water at 50°-60° C. Then, 0.8 mole of bisphenol A and next 0.014 mole of 30% hydrochloric acid were added. The pH of the admixture was 1.4 (measured by the same way as described above), and it was heated 30 minutes at 100° C to continue the novolak forming reaction, then dehyration was carried out under vacuum keeping the temperature of the admixture at 150°-160° C, finally a novolak type phenolic resin was obtained which showed a melting point of 90° C and a pH of 3.4 (measured by the same way described above).

The resin was used in the following formulation and the comprised adhesive was tested against various adherends as shown in Table 2.

| Formulation of Adhesive for Table 2 | |
|---|---|
| | Noncurable Cement |
| Hycar #1042 | 100 parts |
| Phenolic Resin (Example 2) | 50 parts |
| Methyl Ethyl Ketone | 300 parts |
| Toluene | 150 parts |

B. Bonding strength tests of various kinds of substrates which were bonded by cements prepared by blending 50 parts of the resin of 2 A with 100 parts of Hycar #1042 (the same blend ratio as the Uncurable Cement described in Table 1). The results in Table 2 show such excellent bonding properties that it is evident the cement is usable for general purposes.

Table 2.

Adhesion Tests of Various Kinds of Substrates.

| Substrates | Bonding Strength (kg/in) |
|---|---|
| Canvas - Canvas | 10.2 |
| Canvas - Wood | 11.5 |
| Nitrile Rubber - Nitrile Rubber | 17.0 |
| Nitrile Rubber - Sheet Iron | 2.5 |

Note: (1)The test conditions were all the same as described in Table 1.
(2)Measured values were obtained at 20° C, and 2 days after bonding.

Comparative Example 1

Any cement obtained by mixing an appropriate quantity of toluene and methyl ethyl ketone after blending 50 parts of PR-50483 (a product of Sumitomo Durez Company, Ltd.) CKR-1634 (a product of Showa Union Company, Ltd.) or SP-12 (a product of Harima-Schenectady Company, Ltd.), respectively a heat-reactive type alkyl phenolic resin to 100 parts of Hycar #1042, was found to be less than 1 kg/in. in initial bonding strength, and also 0 kg/in. in bonding strength at elevated temperature (60° C), by the adhesion test on substrates, flexible polyvinyl chloride leather versus sheet iron. But, they were all excellent for staining resistance of polyvinyl chloride.

Comparative Example 2

The bonding strength of a solvent cement obtained by blending 50 parts of PR-12687 (product of Sumitomo Durez Company, Ltd. which is widely used as a thermosetting phenolic resin blending for nitrile rubber) with 100 parts of Hycar #1042 indicated considerable improvement both in initial bonding strength and in bonding strength at elevated temperature, but it was very poor for staining resistance of polyvinyl chloride.

Comparative Example 3

A solvent cement, a blend of 50 parts of phenolic resin [which was obtained by reacting simply a mixture of bifunctional phenol and multi- (three and more) functional phenol and aldehydes] and 100 parts of Hycar #1042 showed medium properties which values come between Comparative Example 1 and 2, and it did not show an excellent property for staining resistance of polyvinyl chloride.

As is evident from the foregoing examples, the rubber cement compositions of the invention are useful with a wide variety of substrates. Metals such as sheet iron and steel; polymers such as polyvinyl halide, particularly polyvinyl chloride leather, films and sheets; fabrics such as cotton cloth, canvas, leather, as well as wood and other materials. The cement compositions can be used for bonding like or unlike materials.

In the foregoing examples, the Hycar #1042 is a low temperature polymerized, NBR-acrylonitrile butadiene rubber having an acrylonitrile content of 33 percent by weight, a specific gravity of 0.98 and a Mooney viscosity of 70–85.

The foregoing specification is intended to illustrate and exemplify the invention but not to limit it. Various changes and modifications can be made in the compositions and methods of the invention without departing from the spirit and scope of the invention.

We claim:

1. In a bonded article comprising at least two solid adherend substrates bonded with a rubber cement composition comprising nitrile rubber and a phenolic resin derived from a mono-hydroxyphenol, the improvement wherein the phenolic resin consists essentially of phenolic resin produced by (a) condensing a bifunctional phenol and an aldehyde in a molar ratio of about 0.5 to 3 moles of aldehyde per mole of bifunctional phenol under alkaline conditions, and (b) reacting the resulting condensation product with a polyfunctional phenol having at least 3 reactive positions on the phenyl nucleus in a molar ratio of about 0.05 to 2.5 moles of polyfunctional phenol per mole of bifunctional phenol in said condensation product in the presence of a sufficient amount of acid to provide acid catalysis of the condensation of the aldehyde and the phenol, to produce a phenolic resin having a number average molecular weight of about 700 to 1,900 and a melting point of about 80° to 160° centigrade.

2. The article of claim 1 wherein the two substrates are selected independently from the group consisting of polyvinyl chloride, cotton cloth, leather, wood, canvas, nitrile rubber, and metal.

3. The article of claim 2 wherein the metal is iron.

4. The article of claim 3, wherein the components of the resin are present in a proportion of about 25 to about 150 parts by weight of phenolic resin to 100 parts by weight of rubber.

5. The article of claim 4 wherein the components of the resin are present in a proportion of about 50 to about 100 parts by weight of phenolic resin to 100 parts by weight of rubber.

6. The article of claim 3 wherein the aldehyde is formaldehyde.

7. The article of claim 6 wherein the polyfunctional phenol is phenol.

8. The article of claim 7 wherein the bifunctional phenol is paratertiary butylphenol.

9. The article of claim 3 wherein the aldehyde is acetaldehyde.

10. The article of claim 9 wherein the polyfunctional phenol is bisphenol A.

11. The article of claim 10 wherein the bifunctional phenol is paraoctyl phenol.

12. The article of claim 3 wherein the acid is selected from the group consisting of formic acid, oxalic acid, acetic acid, hydrochloric acid, sulfuric acid, benzene sulfonic acid, and para-toluene sulfonic acid.

13. The article of claim 3 wherein a substrate of canvas is bonded to another substrate of canvas.

14. The article of claim 3 wherein a substrate of canvas is bonded to a substrate of wood.

15. The article of claim 3 wherein a substrate of nitrile rubber is bonded to another substrate of nitrile rubber.

16. The article of claim 3 wherein a substrate of nitrile rubber is bonded to a substrate of iron.

17. In a bonded article comprising an adherend substrate of flexible polyvinyl chloride bonded to at least one other adherend substrate with a rubber cement composition comprising nitrile rubber and a phenolic resin derived from a mono-hydroxyphenol, the improvement wherein the phenolic resin consists essentially of phenolic resin produced by (a) condensing a bifunctional phenol and an aldehyde in a molar ratio of about 0.5 to 3 moles of aldehyde per mole of bifunctional phenol under alkaline conditions, and (b) reacting the resulting condensation product with a polyfunctional phenol having at least 3 reactive positions on the phenyl nucleus in a molar ratio of about 0.05 to 2.5 moles of polyfunctional phenol per mole of bifunctional phenol in said condensation product in the presence of a sufficient amount of acid to provide acid catalysis of the condensation of the aldehyde and the phenol, to produce a phenolic resin having a mumber average molecular weight of about 700 to 1,900 and a melting point of about 80° to 160° centigrade.

18. The article of claim 17 wherein said other adherend substrate is selected from the group consisting of flexible polyvinyl chloride, cotton cloth, leather, wood, canvas, nitrile rubber and metal.

19. The article of claim 18 wherein the metal is iron.

20. The article of claim 19 wherein the flexible polyvinyl chloride is bonded to a flexible polyvinyl chloride substrate.

21. The article of claim 19 wherein the flexible polyvinyl chloride is bonded to a substrate of iron.

* * * * *